Patented May 19, 1953

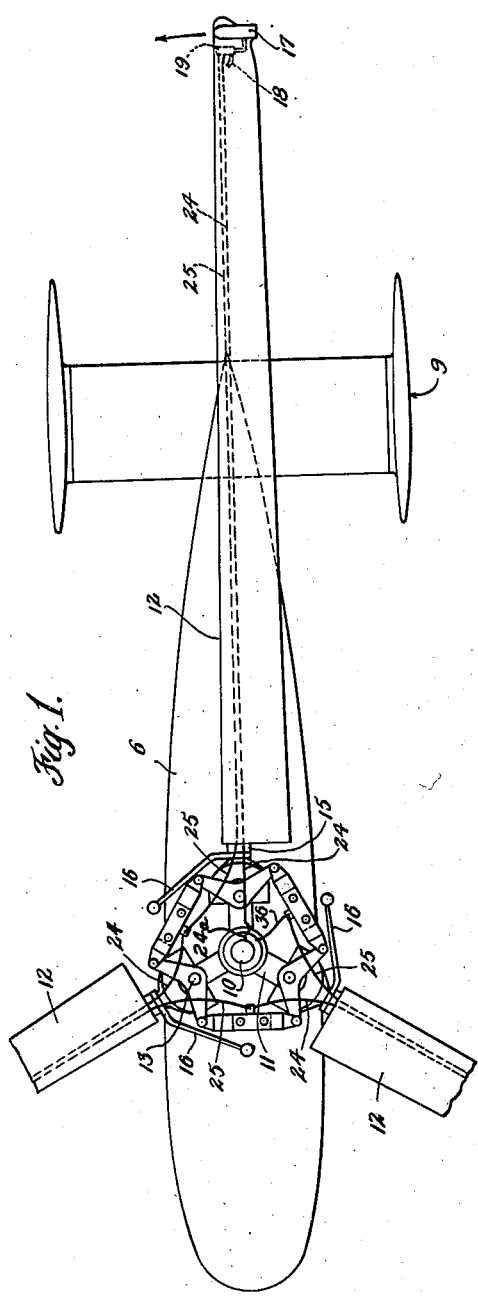
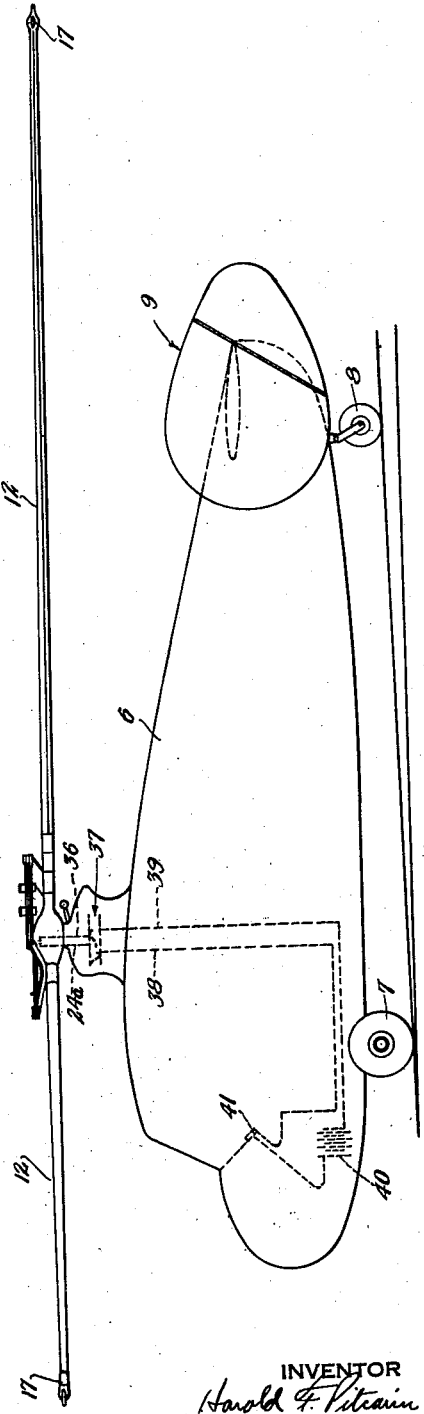

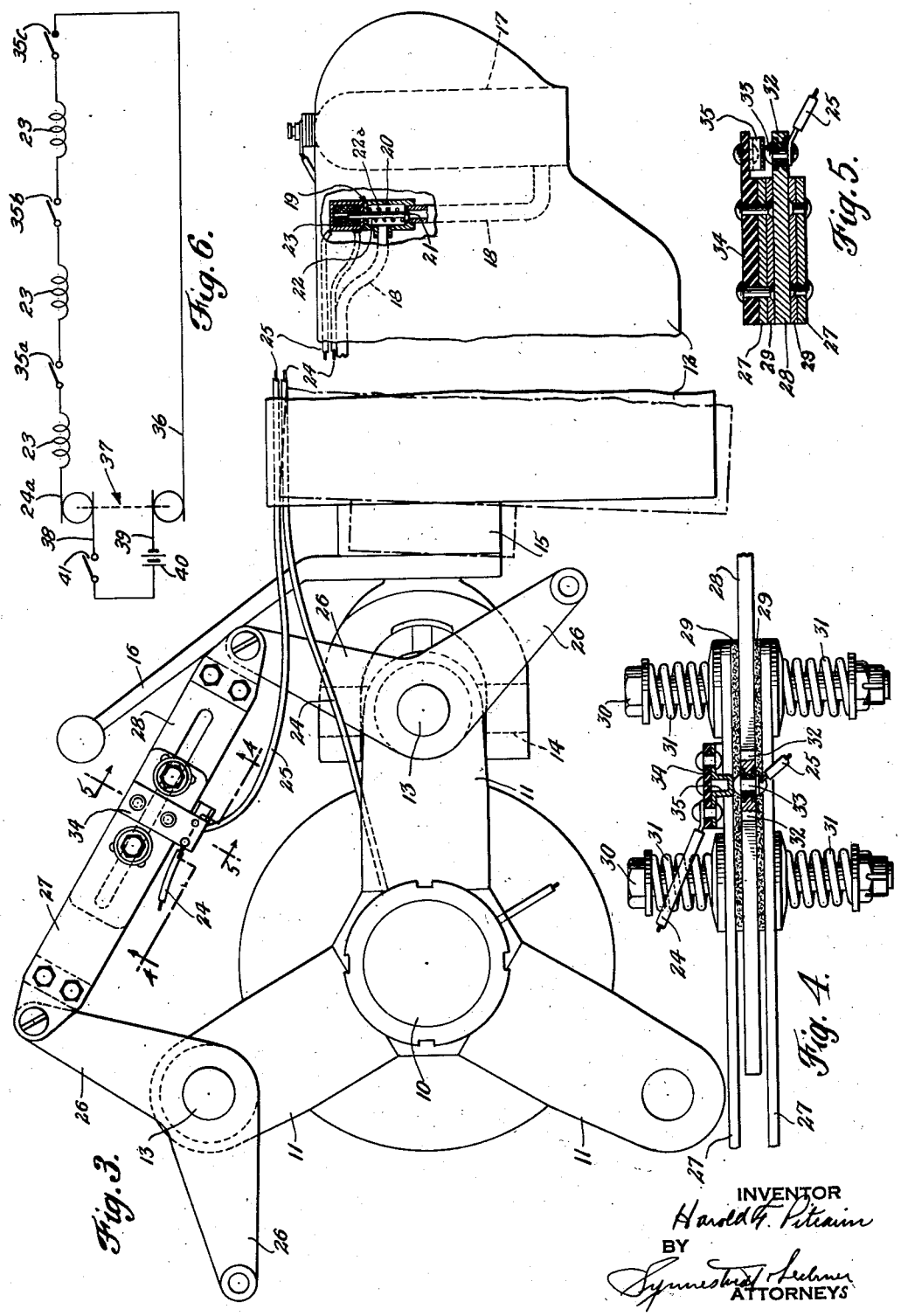

2,638,991

UNITED STATES PATENT OFFICE 2,638,991

CONTROL MECHANISM FOR JET DRIVEN AIRCRAFT SUSTAINING ROTOR BLADES

Harold F. Pitcairn, Bryn Athyn, Pa., assignor to Autogiro Company of America, Philadelphia, Pa., a corporation of Delaware Application November 15, 1947, Serial No. 786,178

14 Claims. (Cl. 170—135.4)

This invention relates to aircraft of the type equipped with one or more bladed sustaining rotors, and the invention is particularly applicable to such rotor equipped aircraft wherein the rotor is adapted to be driven by jet devices carried by rotor blades. Moreover, most features of the invention are of especial utility when employed in an aircraft having a sustaining rotor normally adapted to be jet driven, but capable also of autorotation.

An important general object of the invention is the provision of control mechanism for a plurality of rotor driving jets, the control mechanism being arranged so that a change in the operation of one jet influences the operation of another jet or of all jets. In the preferred arrangement, the control mechanism is arranged to terminate operation of all jets automatically upon termination of operation of any one, to thereby avoid continued operation of the rotor under conditions of severely unbalanced driving forces.

In considering another object of the invention it is first noted that a preferred form of multibladed rotor is one incorporating blade pivots providing freedom for lag-lead movement. With such a rotor, it is an object of the invention to provide for termination of the operation of all jets, upon termination of the operation of any one jet, this action being automatic and responsive to distortion in the plan pattern of the blades incident to termination of operation of said one jet.

In accordance with another aspect of the invention, a jet equipped rotor blade is provided with a jet shut-off device located closely adjacent to the jet itself, this device preferably taking the form of a shut-off valve in the fuel supply line to the jet, so that upon closure of the valve the operation of the jet is substantially immediately terminated. In a rotor equipped as just described, it is a further object of the invention to provide a manual control for the several shut-off valves, the manual control being located in the body of the aircraft and accessible for operation by the pilot.

How the foregoing and other objects and advantages are attained will appear more fully from the following description referring to the accompanying drawings, in which—

Figure 1 is a plan view of an aircraft having a sustaining rotor incorporating three blades (two being broken off in the figure), this view illustrating the application of the jet control system of the present invention;

Figure 2 is an outline side elevational view of the aircraft shown in Figure 1;

Figure 3 is an enlarged plan view of the rotor hub of the aircraft shown in Figure 1, illustrating certain of the control devices which are associated with the hub and with the root end mountings of the blades;

Figure 4 is a further enlarged view of certain control parts, taken as indicated by the line 4—4 applied to Figure 3;

Figure 5 is a view on the scale of Figure 4 but taken as indicated by the section line 5—5 applied to Figure 3; and Figure 6 shows in diagrammatic form the electrical circuit, the various parts of which appear in Figures 1 to 5.

The aircraft illustrated in Figures 1 and 2 by way of example comprises a body 6 having landing wheels 7—8, an empennage generally indicated at 9, and a pilot or occupant's compartment toward the forward end.

As shown more fully in Figure 3, the rotor comprises a hub 10 having three projecting lugs 11 each providing for the attachment of a rotor blade 12. The rotor blades themselves may be of any desired construction and each blade is mounted by means of a universal joint incorporating vertical and horizontal pivots 13 and 14. Preferably also each blade is provided with a pitch change mounting indicated at 15, about which the pitch angle of the blades may be altered, as by means of a control arm 16. The details of construction of the blade mounting pivots 13, 14 and 15 and of the immediately associated parts need not be considered herein since they form no part of the present invention per se. It is here noted, however, that the horizontal or flapping pivot 14 for each blade permits the blade to swing upwardly or downwardly in a manner accommodating differential flight forces. The vertical or drag pivot 13 provides freedom for laglead movement of the blade within its rotative path of travel. The pitch pivot 15 permits the blade to change its geometrical pitch angle, the pitch of the several blades being differentially variable about the circle of rotation for purposes of control and the pitch of all blades being variable in the same sense for purposes of increasing or decreasing the lift of the rotor. This last pitch change, i. e., change of mean blade pitch, is also utilized to vary the mean rotor blade pitch angle between an autorotative value and a higher value such as may be desirable for driven operation of the rotor, as is now understood in this art.

Before describing the jet drive and control system of the present invention it is further pointed out that various features of the invention are applicable to a rotor incorporating any desired number of blades, although most features of the invention are particularly adapted to a rotor incorporating at least three blades.

In the preferred arrangement of the invention, each blade is equipped with a jet driving device generally indicated at 17, the details of which need not be considered herein since they form no part of the present invention per se. The jet device 17 is mounted adjacent the tip of the blade, the several jets serving to drive the rotor in the direction indicated by the arrow in Figure 1. Each jet device is supplied with operating fuel through a supply pipe 18, the several fuel lines 18 being extended radially inwardly to the hub and thence through the hub to a fuel supply tank in the body of the aircraft. The arrangement of the fuel lines and fuel supply also need not be considered herein, although it is mentioned that a suitable arrangement of rotative connections at the hub for such fuel lines is fully disclosed in copending application of Paul H. Stanley, Serial No. 255,030, filed November 6, 1951, as a division of his application Serial No. 650,213, filed February 26, 1946, now Patent No. 2,601,463, issued June 24, 1952, both the application and patent being assigned to the assignee of this application.

According to the present invention, a fuel shut-off device 19 is introduced into the fuel line 18 at a point closely adjacent to the jet device itself. As best seen in Figure 3 this device comprises a valve body 20 having a plug valve 21 positioned so that the normal flow of fuel through the line tends to seat and close the valve. The valve is provided with a stem 22 positioned to act as the armature of a solenoid 23. Energization of the solenoid thus lifts the valve 21 from its seat and provides for the delivery of fuel to the jet device. A spring 22a may be employed to ensure seating of valve 21 at all times when the solenoid is not energized.

The electrical winding of the solenoid is adapted to be supplied with energizing current through the wires 24 and 25 which extend radially inwardly to the inner end of the blade for connection with switch or control devices at the rotor hub described below.

Attention is now called to the fact that each of the drag pivots 13 carries a double ended lever which is fixed thereto, each drag pivot 13 also being fixed to the blade mounting parts so as to oscillate with the blade upon lag-lead movement thereof. The arms 26—26 of this double ended lever are interconnected in a series around the rotor hub through blade damper devices one of which is fully shown in Figures 3, 4 and 5. As there seen each damper device comprises a pair of plate-like members 27—27 which embrace another similar member 28. The pair of members 27—27 is pivoted to an arm 26 associated with the drag pivot 13 for one blade and the member 28 is pivoted to an arm 26 associated with the drag pivot 13 for an adjacent blade. Relative lag-lead movements of the blades therefore cause the members 27—27 and 28 to move with respect to each other, and friction material 29 is interposed therebetween as clearly appears in Figure 4. The members 27 and 28, with the friction material therebetween, are maintained in frictional interengagement by means of bolts 30 which are extended through a slot formed in the member 28, the bolts 30 having springs 31 associated therewith to urge the various plates of the damper toward each other.

Plate 28 has a tab 32 projecting therefrom and carrying an electrical contact 33 as by an insulating bushing, the wire 25 for the solenoid 23 being connected with this contact, as shown.

A strip 34 formed of insulating material is carried by one of the plates 27 and this strip in turn carries a contact element 35 adapted to cooperate with the contact 33. Contacts 33 and 35 form switch 35a which is normally closed. With this arrangement of contacts, relative lag-lead movement of adjacent blades causes the contacts 33 and 35 to move with respect to each other and, if this movement goes beyond a predetermined angular range, the contacts are disengaged from each other. However, concurrent lagging or leading movement of all blades in the same sense and to the same extent does not cause movement of the parts of the blade dampers, and therefore does not disengage the contacts 33—35.

As best seen in Figures 1 and 6, the connections 24 and 25 for the several blades are associated with the switches 35a, 35b and 35c in a series around the rotor hub. At one point in the series, one of the wires 24 is carried inwardly at 24a for connection with a slip ring, and in addition one of the contacts 33 is coupled by a wire 36 to another slip ring through which current may be supplied from the body of the aircraft. It will be understood that any appropriate rotative connection may be employed between the wiring carried by the rotor and the wiring in the body of the aircraft, but, as somewhat diagrammatically illustrated in Figure 2, an appropriate arrangement includes the slip ring and contact device generally indicated at 37. The two nonrotative connections 38 and 39 are associated with a current supply source, such as the battery indicated at 40 and also with a switch as indicated at 41.

With the wiring above described, the supply of current to the solenoids 23 for the several blades may be cut off by the manual control switch 41. Moreover, relative lag-lead movement of the blades of the rotor will cause one or more of the switches 33—35 to disconnect, in which event the circuit is also broken to all of the solenoids 23.

The operation of the control mechanism and system above described is as follows:

Assume first that the rotor is in normal power driven operation, i. e., operation of all of the jet devices 17 in a normal and uniform manner. In these circumstances if the fuel supply to the several jet devices is varied, this may cause the several blades of the rotor to lag or lead, all in the same sense, in which event the switches 33—35 are not disconnected, since such conjoint and similar lagging or leading movement of all of the blades does not cause appreciable relative movement of the cooperating switch contacts 33 and 35. However, in the event of pronouncedly irregular operation as between the several jets or in the event that one jet ceases entirely to operate, the result is a relative movement of one blade with respect to another about the drag pivots, resulting in a distortion of the plan pattern of the blades. If the plan pattern distortion exceeds a predetermined angular range, for example, if the angle between adjacent blades is altered more than about 1½°, one of the pairs of cooperating switch contacts 33 and 35 will become disengaged, thereby breaking the circuit through all of the solenoids 23. When this occurs the action of the spring 22a and/or the fuel flow through the supply lines 18 causes the valves 21 to close, thereby terminating the operation of all of the jet devices. In this way provision is made for automatically terminating the operation of all of the jets in the event of failure of any one, and thereby continued operation of the rotor under severely unbalanced conditions of drive is avoided.

It is of special advantage in the system described above that the jet shut-off devices are located closely adjacent to the jets themselves, since in this way the elimination of the jet forces occurs almost immediately upon termination of operation of any one of them.

The location of the shut-off devices close to the jets themselves is further of importance even under conditions of normal operation and control, as by the pilot's switch 41. Quick response to manual adjustment of the system is thereby assured.

It is contemplated as hereinabove mentioned, that the mean rotor blade pitch angle be variable through a range including an autorotative angle, so that with either manual or automatic shut-off of the jet devices, operation of the rotor may be continued by aerodynamic action.

I claim:

1. For an aircraft having a sustaining rotor, a plurality of rotor blades, means for mounting each blade for swinging movement in the lag-lead sense, a driving jet carried by each blade, individual control devices for the several jets, and mechanism responsive to relative lag-lead blade movement to actuate the control devices to terminate operation of the several jets.

2. For an aircraft having a sustaining rotor, a plurality of rotor blades, means for mounting each blade for swinging movement in the lag-lead sense, a driving jet carried by each blade, individual devices for controlling the operation of the several jets, and mechanism responsive to lag-lead blade movement for actuating said devices.

3. For an aircraft having a sustaining rotor, a plurality of blades, a driving jet carried by each blade, individual jet shut-off devices for the several jets, providing for termination of the normal rotor driving operation of the several jets, a control system for the jet shut-off devices including an actuating element for the shut-off device for the jet on one blade, and mechanism connected with said actuating element and with another blade responsive to cessation of the rotor driving operation of the jet on said other blade to effect shut-off of the shut-off device on said one blade.

4. A construction according to claim 3 in which said mechanism comprises means operative to actuate the shut-off devices for all jets upon cessation of operation of one jet.

5. For an aircraft having a multi-bladed sustaining rotor, driving jets carried by the blades adjacent the tips thereof, fuel feed lines extended radially outward through the blades to feed said jets, individual fuel shut-off devices associated with the feed lines at points closely adjacent to the jets, providing for termination of the normal rotor driving operation of the several jets, a control system for the fuel shut-off devices including an actuating element for the shut-off device for the fuel feed line on one blade, and mechanism connected with said actuating element and with another blade responsive to cessation of the rotor driving operation of the jet on said other blade to effect actuation of the fuel shut-off device on said one blade.

6. For an aircraft having a bladed sustaining rotor, a driving jet carried by a blade adjacent the tip thereof, a fuel feed line extended radially outwardly through the blade to feed said jet, and a shut-off device in said line including a movable valve member arranged to be urged toward closed position under the influence of the fuel flow in said line, said device further including controllable means for retaining the valve member open against the action of the fuel flow in said line.

7. A construction according to claim 6 in which the sustaining rotor incorporates a plurality of blades equipped as specified in claim 6, and further including control mechanism responsive to cessation of operation of one jet to actuate the controllable means for another blade in a sense providing for closure of the control valve member for said other blade under the influence of the fuel flow in its fuel line.

8. A construction according to claim 6 having mounting means for the rotor blades providing for blade swinging movement in the lag-lead sense so that cessation of operation of the jet on one blade results in lagging of that blade with respect to another, the control mechanism including means operated by such blade lagging to effect the shut-off of the fuel line of another blade.

9. For an aircraft having a sustaining rotor incorporating a plurality of blades, a driving jet carried by each blade and means mounting each blade for swinging movement in the lag-lead sense, in which construction cessation of operation of one jet results in distortion of the normal plan pattern of the several blades, a control system for the several driving jets comprising mechanism responsive to distortion of the plan pattern of the blades to terminate operation of all of the jets.

10. For an aircraft having a sustaining rotor incorporating a plurality of blades, a driving jet carried by each blade and means mounting each blade for swinging movement in the lag-lead sense, in which construction cessation of operation of one jet results in distortion of the normal plan pattern of the several blades, blade movement damper devices each incorporating two relatively movable members interconnecting adjacent blades of the rotor and yieldingly resisting relative lag-lead movements of the blades, and a control system for the several driving jets comprising mechanism connected with the relatively movable members of the damper devices and responsive to relative movement thereof to control the operation of the jets.

11. For an aircraft having a sustaining rotor incorporating a plurality of blades, a driving jet carried by each blade and means mounting each blade with freedom for lag-lead movement, individual electrically operated control devices for the several jets, and electric control switches mechanically actuable by relative lag-lead movements of adjacent blades around the rotor, all of said devices and switches being interconnected in series to provide for operation of all of said devices upon actuation of any one of said switches.

12. A construction according to claim 11 in which said control devices have two positions of adjustment in one of which, corresponding to current-on, the jets are in operative condition and in the other of which, corresponding to current-off, the jets are in inoperative condition.

13. A construction according to claim 11 in which the switches referred to are mounted on the rotor, the arrangement further including a manually operable switch in the body of the aircraft also connected in series with the other switches and the control devices.

14. A construction according to claim 11 in which the switches are arranged to break the circuit only upon relative lag-lead movement of the blades beyond a predetermined angular range.

HAROLD F. PITCAIRN.

References Cited in the file of this patent

UNITED STATES PATENTS

| Number | Name | Date |
|---|---|---|
| 1,021,521 | Heroult | Mar. 26, 1912 |
| 1,820,946 | Pitcairn | Sept. 1, 1931 |
| 1,897,092 | Wier | Feb. 14, 1933 |
| 2,142,601 | Bleecker | Jan. 3, 1939 |
| 2,446,129 | Dalton | July 27, 1948 |

FOREIGN PATENTS

| Number | Country | Date |
|---|---|---|
| 47,909 | Netherlands | Mar. 15, 1940 |